United States Patent [19]
Hansen, Jr.

[11] 3,883,019
[45] May 13, 1975

[54] POWER ACTUATED FOLDING GOOSE NECK TRAILER

[76] Inventor: O. Duane Hansen, Jr., Route 3, Canton, S. Dak. 57013

[22] Filed: Sept. 4, 1973

[21] Appl. No.: 393,674

[52] U.S. Cl. ............................ 214/506; 280/425 A
[51] Int. Cl. ............................................. B60p 1/04
[58] Field of Search...... 214/506; 280/423 B, 425 A

[56] References Cited
UNITED STATES PATENTS

| | | | |
|---|---|---|---|
| 2,653,827 | 9/1953 | Manning | 214/506 |
| 3,158,402 | 11/1964 | Clement | 214/506 |
| 3,419,169 | 12/1968 | James | 214/506 |
| 3,756,443 | 9/1973 | Verschage | 214/506 |

FOREIGN PATENTS OR APPLICATIONS

| | | | |
|---|---|---|---|
| 1,139,417 | 1/1969 | United Kingdom | 280/425 A |

*Primary Examiner*—Robert J. Spar
*Assistant Examiner*—Donald W. Underwood

[57] ABSTRACT

A low platform trailer having three segments; a hitch platform, a flat bed for the main load, and an intermediate, or goose-neck section between the hitch platform and the flat bed. The segments are united with joints that pivot and which are driven by separate power rams. The hitch platform and goose-neck section are unfolded down for easy loading and unloading of the flat bed. After loading, the hitch platform and goose-neck section are folded up for lifting of the loaded flat bed to the traveling position and attachment of the hitch platform to a tractor truck. The goose-neck section forms an angle of about 30° with the horizontal so that small rubber-tired and tracked machines may be readily driven up or down the goose-neck section to or from the flat bed.

1 Claim, 9 Drawing Figures

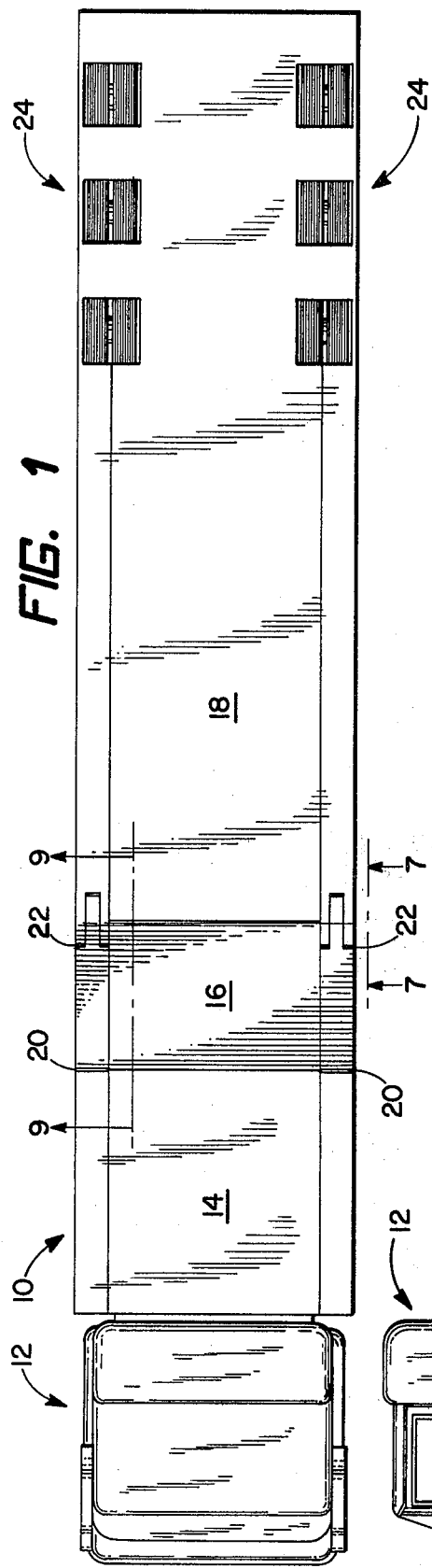
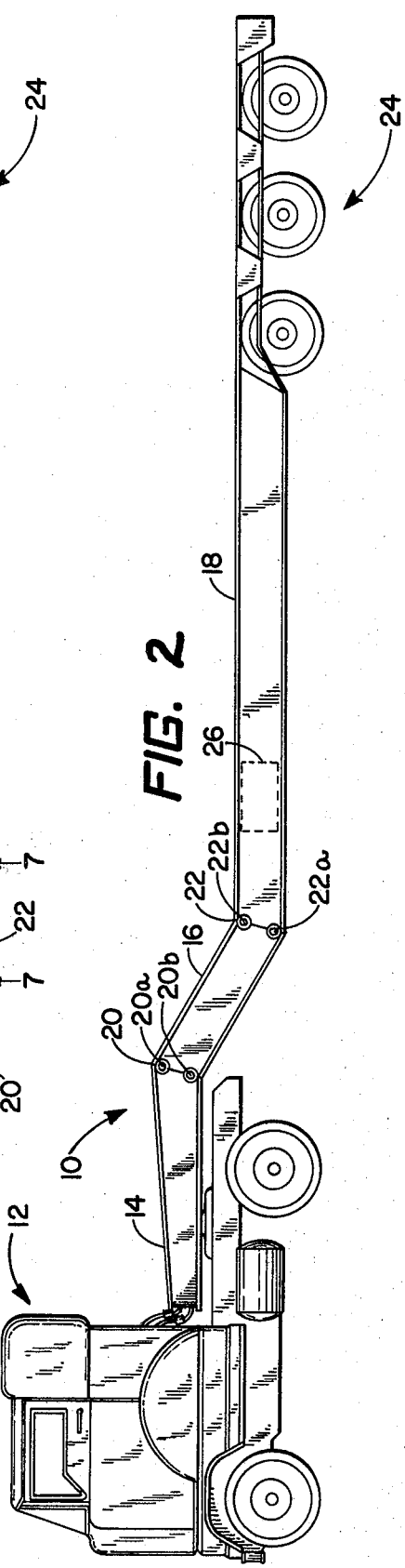
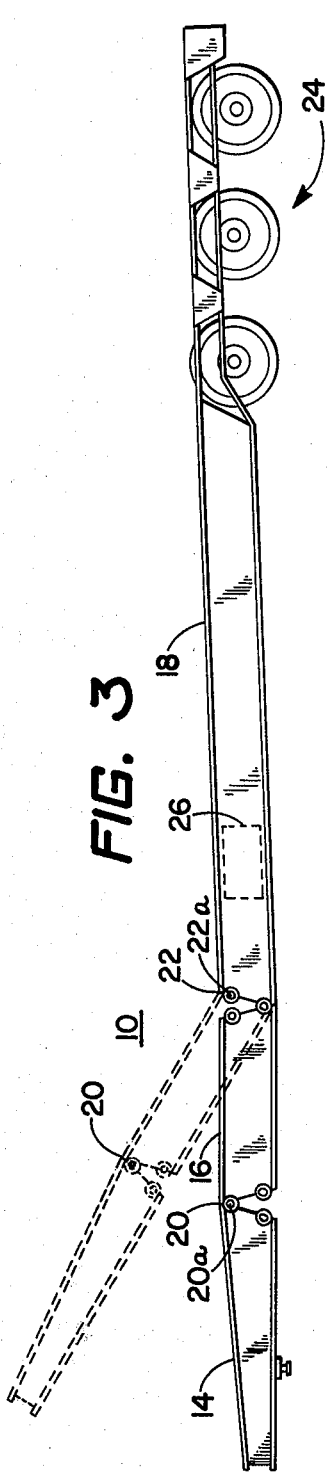

POWER ACTUATED FOLDING GOOSE NECK TRAILER

FIELD OF THE INVENTION

The invention is a goose-neck trailer with three segments, two of which can pivot to provide a loading ramp and to lift the loaded trailer into traveling position.

PRIOR ART

U.S. Pat. No. 3,419,169, (James) describes a trailer which includes a pair of parallel links connected between the hitch platform and the flat bed and a single hydraulic ram connected between the linkage and ground to lift the hitch platform and flat bed to traveling position and lower them to loading position.

The structure of the trailer in this application is quite different; for example, a single—rather than two parallel links—is used, and the joints are actuated with separate power rams which are connected across each of the two joints. Besides being structurally different, it is also operationally different.

U.S. Pat. No. 3,698,582 (Weinmann) describes a trailer with a vertical claw for engaging a pin on the forward end of the flat bed. Structurally and operationally, it is quite different from the trailer of this application.

SUMMARY OF THE INVENTION

The trailer comprises a main flat bed, a hitch platform, and an intermediate section sometimes called a goose-neck. The rear end of the hitch platform is pivotally joined to the front end of the goose-neck, and the rear end of the goose-neck is pivotally joined to the front end of the flat bed. A source of mechanical energy is connected across the joint between the hitch platform and the goose-neck for bi-directionally rotating the hitch platform with respect to the goose-neck. Another source of mechanical energy is connected across the joint between the goose-neck (and the hitch platform) with respect to the flat bed. The joints between the hitch platform and the goose-neck and between the goose-neck and the flat bed are locked in the traveling position with pins. When in the traveling position, the goose-neck forms an angle of about 30° with the horizontal. In going from the traveling position to the loading position, the locking pins are withdrawn from the joints and the hitch platform and goose-neck are unfolded by the mechanical energy sources to rest substantially flat on the ground. In this orientation the hitch platform and the goose-neck section serve as a ramp for loading the main flat bed section of the trailer, which is much easier and safer than loading over the relatively high rear deck.

THE DRAWINGS

FIG. 1 is a top view of the goose-neck trailer;

FIG. 2 is a side view of the trailer in traveling position;

FIG. 3 shows the trailer in two positions, the loading position and a position in between the loading and the traveling position;

DESCRIPTION

Figure 4:
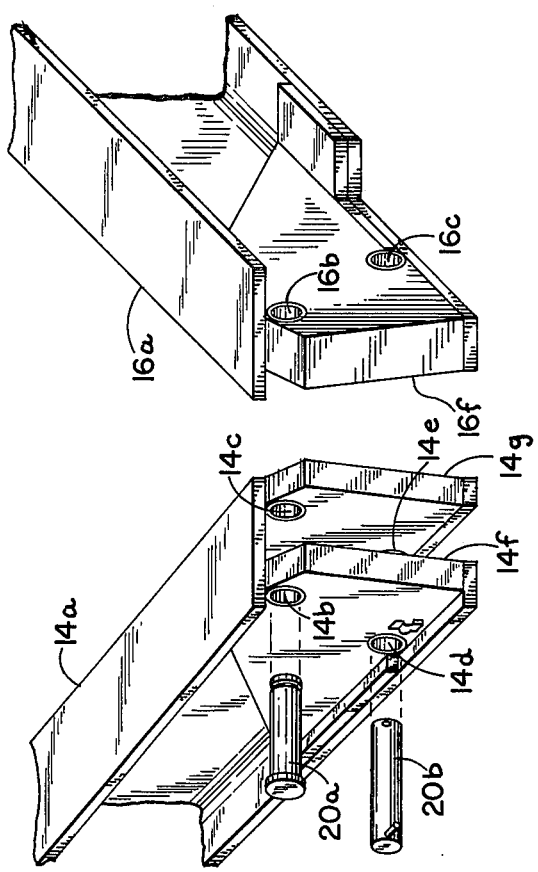
FIG. 4 is a perspective view of the joint between the hitch platform and the goose-neck.

FIG. 1 is a top view of a goose-neck trailer 10 being pulled by a tractor-truck 12. Trailer 10 includes segments 14, 16, and 18 united by joints 20 and 22 between segments 14, 16, and segments 16 and 18 respectively. Segments 14, 16 and 18 will be referred to as the hitch platform, goose-neck, and flat bed respectively. The decks of the hitch platform, goose-neck, and flat bed may be made of hardwood.

Hitch platform 14 is connected to truck 12 by means of a pin which hooks into a saddle behind the cab of the truck. The rear end of flat bed 18 is supported on a set of wheels 24. The suspension may be of the aligned, rigid walking beam type, which allows full oscillation and equal loading up to a 9-inch bump.

The profile of trailer 10 in the traveling position is clearly shown in the side view of FIG. 2. Goose-neck 16 makes an angle of about 30° with the horizontal so that small rubber-tired or tracked machines may be readily driven up or down the goose-neck while it is in the traveling position.

Each joint 20 and 22 includes a pivot pin and a lock pin; pin 20a and lock pin 20b are associated with joint 20 and pivot pin 22a and lock pin 22b are associated with joint 22.

Joints 20 and 22 are actuated with energy and control signals from a power source 26 (shown in dashed outline) mounted within flat bed 18. Power source 26, which may include a gas engine, is optional, because in many instances power and control can be obtained through lines or hoses from the engine of truck 12.

In FIG. 3, trailer 10 is shown in two positions, a loading position and a position in between the loading and the traveling position (which is shown in FIG. 2). The in between position is shown with dashed lines. In the loading position the goose-neck 16 and the hitch platform 14 are substantially horizontal and level with flat bed 18 and form a ramp for the flat bed over which vehicles to be loaded and unloaded can be driven.

In doing from the traveling to the loading position, the lock pins 20b and 22b are withdrawn from joints 20 and 22. Power is then applied across the joints causing them to close further until the front end of flat bed 18 drops and contacts the ground beneath. Joint 20 is then opened as shown in the dashed line portion of FIG. 3, and the hitch platform is swung and lifted off the saddle of truck 22. Finally, joint 22 is opened, and hitch platform 14 and goose-neck 16 are swung downward until they are resting on the ground. In going from the loading to the traveling position, the procedure is reversed.

Figure 5:
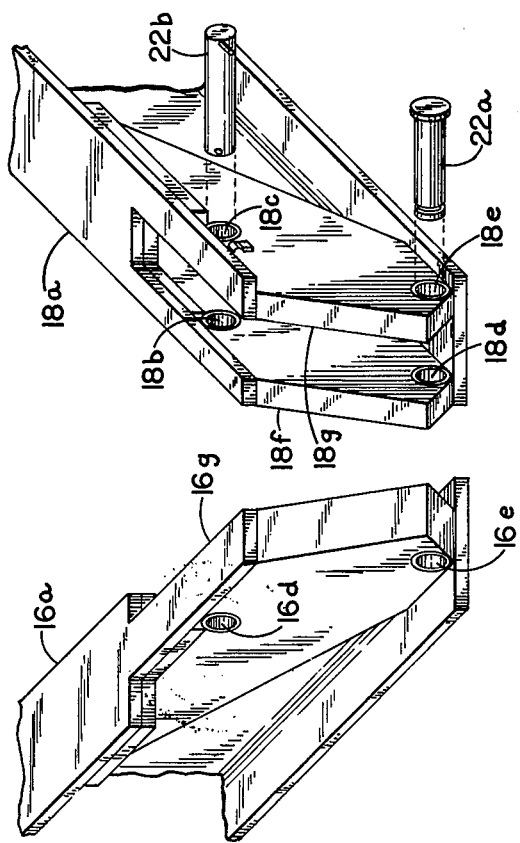
Fig. 5 is a perspective view of the joint between the goose-neck and the flat bed.

Joints 20 and 22 are shown in more detail in FIG. 4 and FIG. 5. In FIG. 4, joint 20 is shown as including hitch platform side beam 14a and goose-neck side beam 16a. The front end of side beam 16a forms a tongue 16f which slides into a yoke formed by extensions 14f and 14g at the rear end of side beam 14a. Side beams 14a and 16a are pivoted on pin 20a which is received by holes 14b and 14c in the upper part of the yoke at the rear end of side beam 14 and by hole 16b in the upper part of tongue 16f at the front end of side beam 16a. Joint 20 is locked in the traveling position by a pin 20b which is received by holes 14d and 14e in the lower part of the yoke of beam 14a and by a hole 16c in the lower part of the tongue of beam 16a.

In FIG. 5, joint 22 is shown as including goose-neck side beam 16a and flat bed side beam 18a. The rear end of beam 16a forms a tongue 16g which slides into a yoke formed on the front end of beam 18a by extensions 18f and 18g. Side beams 16a and 18a are pivoted on pin 22a which is received by holes 18e and 18d in the lower part of extensions 18g and 18f and by the hole 16e in the lower part of tongue 16g. Beams 16a and 18a are locked in the traveling position by pin 22b which is received by holes 18c and 18b in the upper part of extensions 18g and 18f and by hole 16d in the upper part of tongue 16g.

Figure 6:
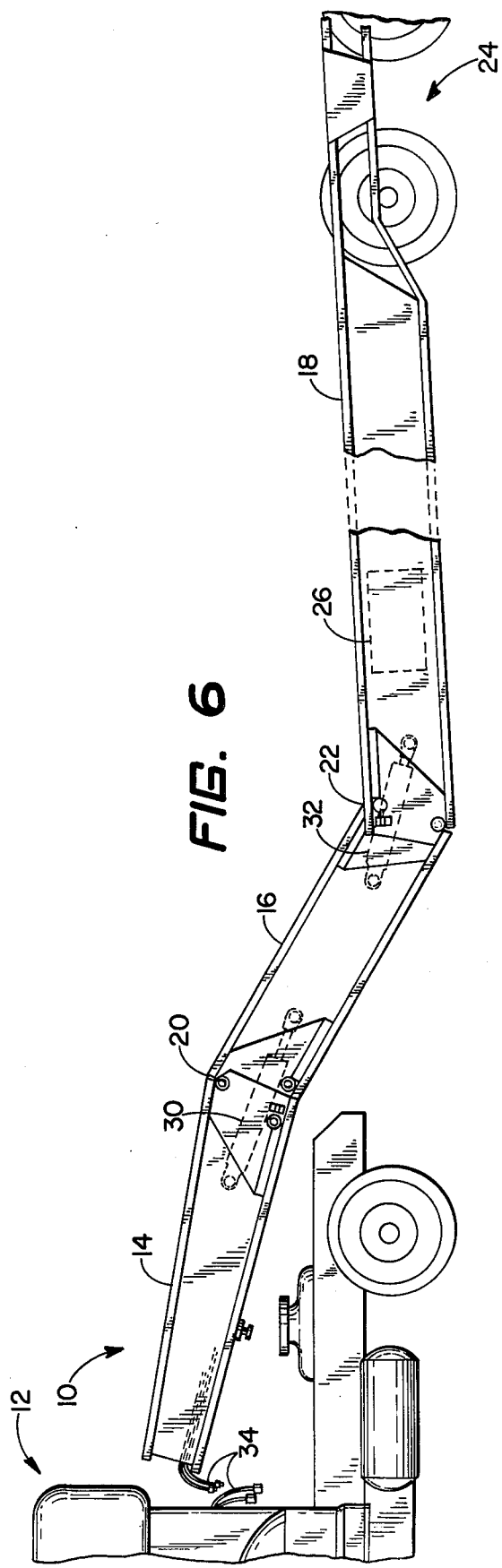
FIG. 6 is a side view of the trailer showing it in an intermediate position in between the traveling position and the loading position.

In FIG. 6, hitch platform 14 is shown being raised from or lowered to the saddle on the rear of truck 12. Joints 20 and 22 are actuated by power rams 30 and 32. The control signals and power for rams 30 and 32 may come from the power unit 26 mounted in flat bed 18 or through lines 34 from truck 12 (which are shown disconnected in FIG. 6).

Figure 7:
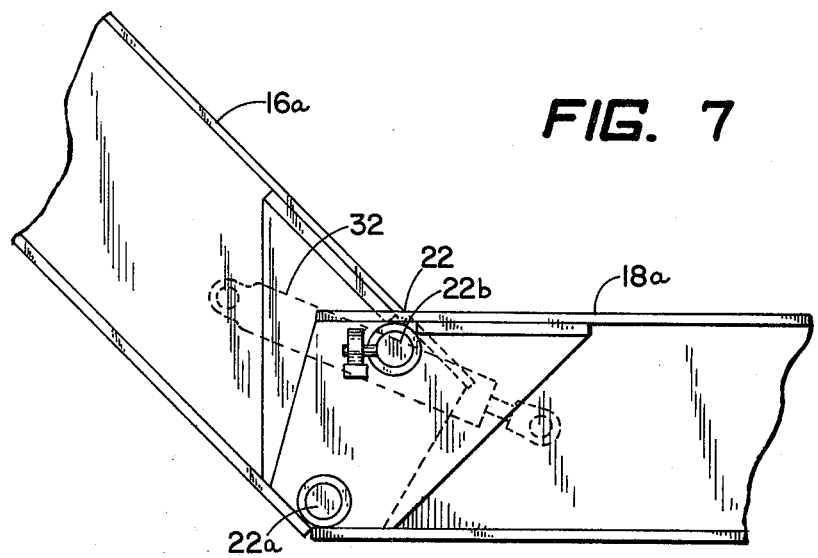
FIG. 7 is a side view of the joint between the goose-neck and the flat bed, showing the relative positions thereof in the closed, or traveling position.

FIG. 7 is a side view of joint 22 showing the relative positions of beams 16a and 18a in the closed or traveling position. Power ram 32 has pivoted beam 16a clockwise around pin 22a, and beams 16a and 18a have been locked in place by pin 22b.

Figure 8:
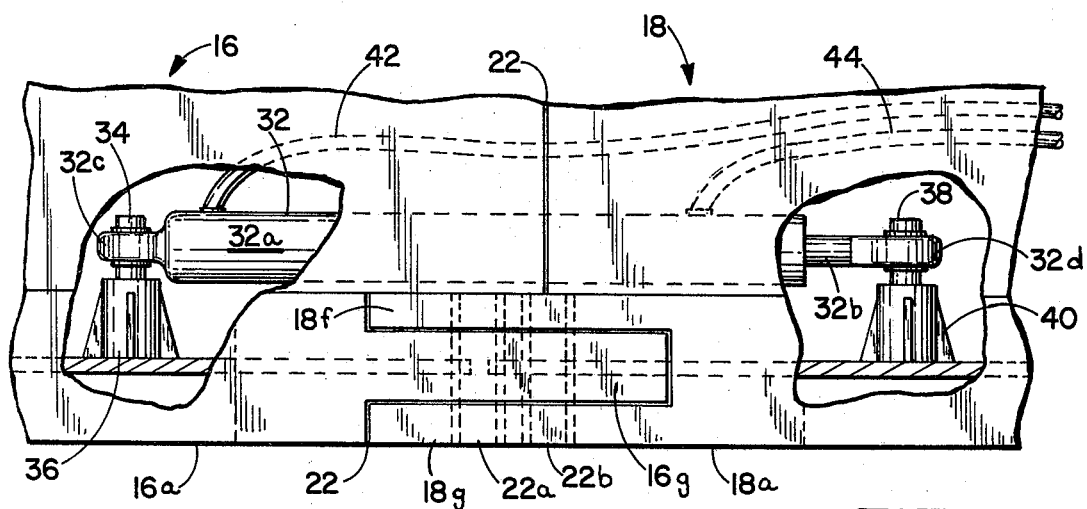
FIG. 8 shows the connection of a power ram across the joint between the goose-neck and the flat bed of the trailer.

FIG. 8 shows how power ram 32 is connected between beams 16a and 18a. Ram 32 includes a long cylinder 32a which receives a piston 32b. A lug 32c on the left of cylinder 32a is securely fastened to a stud 34 which is supported by a base 36 which is welded to the surface of the central web of beam 16a. A lug 32d on the right end of piston 32b is securely fastened to a stud 38 which is supported on a base 40 which is welded to the inner surface of the central web of beam 18a.

Control signals for lengthening and shortening ram 32 are transmitted to cylinder 32a by a line or hose 42. Power, e.g., in the form of hydraulic fluid, is supplied to and received from cylinder 32a under pressure through a line or hose 44. Joint 22 is opened and closed by lengthening and shortening power arm 32.

Figure 9:
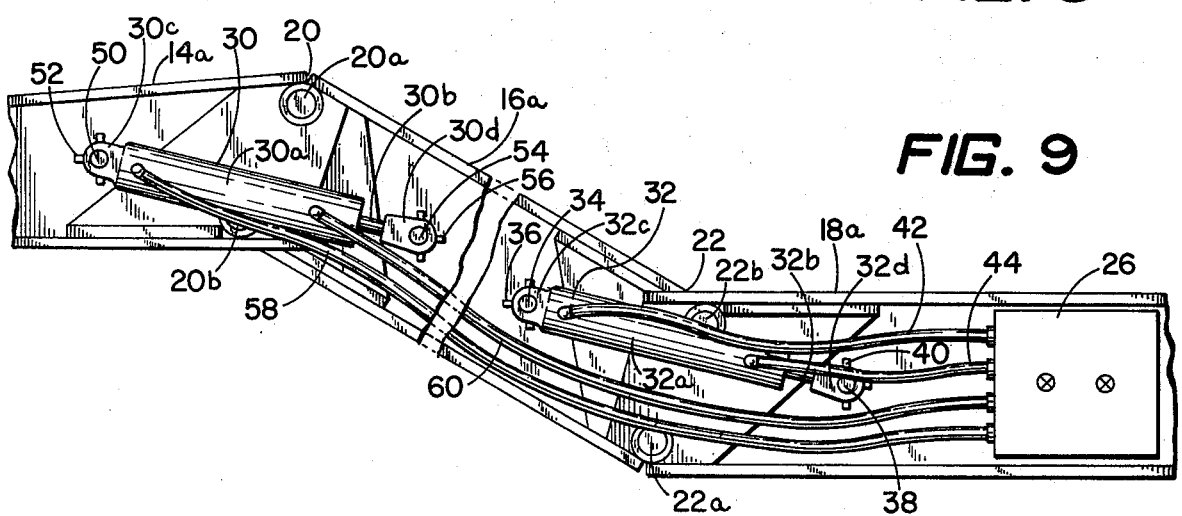
FIG. 9 is a side view of the trailer with the front and rear joints locked in the traveling position.

FIG. 9 is a side view of joints 20 and 22 locked in the traveling position. Power ram 30 includes a long cylinder 30a which receives a piston 30b. A lug 30c at the left end of cylinder 30a is securely fastened to a stud 50 which is supported on a base 52 welded to the inner surface of the central web of beam 14a. A lug 30d on the right end of piston 30b is securely fastened by a stud 54 supported on a base 56 which is welded to the inner surface of the central web beam 16a. Control signals from power unit 26 are supplied to cylinder 30a by a line or hose 58. Power, e.g., in the form of hydraulic fluid, is supplied to and removed from cylinder 30a under pressure through a line or hose 60. Joint 20 is opened or closed by lengthening and shortening ram 30.

What is claimed is:
1. A flat bed trailer, comprising:
   a. a hitch platform;
   b. a flat bed;
   c. an intermediate section;
   d. means for pivotally joining the rear of the hitch platform to the front of the intermediate section, said means including a first pivot pin adjacent to top surffaces of the hitch platform and the intermediate section;
   e. means for pivotally joining the rear of the intermediate section to the front of the flat bed, said means including a second pivot pin adjacent to bottom surfaces of the intermediate section and the flat bed;
   f. means for independently locking both joining means in predetermined positions, said locking means including a first pin positioned generally below the first pivot pin, and a second pin positioned generally above the second pivot pin;
   g. a first source of mechanical energy interconnected between the hitch platform and the intermediate section for bi-directionally rotating the hitch platform with respect to the intermediate section; and
   h. a second source of mechanical energy interconnected between the intermediate section and the flat bed for bi-directionally rotating the intermediate section with respect to the flat bed.

* * * * *